(12) United States Patent
Aykin

(10) Patent No.: US 6,293,409 B1
(45) Date of Patent: Sep. 25, 2001

(54) Y-SHAPED GARBAGE AND RECYCLABLES SEPARATING DISPOSAL SYSTEM

(76) Inventor: Bora F. Aykin, 23 John St., Red Bank, NJ (US) 07701

( * ) Notice: Subject to any disclaimer, the term of this patent is extended or adjusted under 35 U.S.C. 154(b) by 0 days.

(21) Appl. No.: 09/491,091

(22) Filed: Jan. 22, 2000

(51) Int. Cl.$^7$ ....................................................... B07C 7/04
(52) U.S. Cl. ........................................... 209/702; 209/930
(58) Field of Search ..................................... 209/702, 703, 209/706, 707, 911, 924, 930, 942

(56) References Cited

U.S. PATENT DOCUMENTS

| | | |
|---|---|---|
| 1,977,922 | 10/1934 | Serre . |
| 2,636,646 | 4/1953 | Olsen . |
| 3,766,594 * | 10/1973 | Westergren et al. .................. 15/327 |
| 3,825,973 * | 7/1974 | Gwozdz ................................ 16/189 |
| 5,147,056 * | 9/1992 | Ma ...................................... 220/263 |
| 5,205,433 | 4/1993 | Bitsch . |
| 5,339,980 | 8/1994 | Stutler . |
| 5,551,576 * | 9/1996 | Importico ............................ 209/705 |

* cited by examiner

Primary Examiner—Donald P. Walsh
Assistant Examiner—Joseph Rodriguez
(74) Attorney, Agent, or Firm—Ira M. Adler, Esq.

(57) ABSTRACT

A Y-Shaped Garbage and Recyclables Separating Disposal System that consists of a top with two chutes attached to each other at an angle and a stand supporting a foot pedal on the floor, and two containers. One of the containers stores garbage, and the other, attached to the recyclables chute, for recyclables. The drop chute and the recyclables chute are attached to each other forming an upside down "Y" (referred to as "Y-Shaped chute"). The drop chute is vertical allowing anything drop into it to go through it without any obstacle. The recyclables chute is attached to the drop chute at an angle in the middle of the drop chute. The recyclables chute is normally blocked by a blocker not allowing garbage to go into the container for recyclables. The blocker is operated by a foot pedal that is attached to a vertical stand by a hinge and a spring and connected with the blocker by a spring. To deposit recyclables, the foot pedal is pressed down. In this position, by pulling the string connecting the foot pedal with the blocker, the blocker is pulled back, forming an inclined plane for leading recyclables into the chute and container reserved for them. The blocker and the foot pedal return to their normal up position by releasing the foot pedal.

6 Claims, 2 Drawing Sheets

Y-SHAPED GARBAGE AND RECYCLABLES SEPARATING DISPOSAL SYSTEM

FIELD OF INVENTION

The invention pertains to the field of manufacturable products. More specifically, the invention pertains to separation and disposal of household garbage and recyclables

BACKGROUND OF THE INVENTION

It is a need and an established policy in most urban and suburban areas to separate regular household garbage from recyclable materials such as cans and bottles to protect the environment and reduce the long-term damage caused to environment by non-degradables in garbage disposal areas. In the past, a number of disposal systems have been devised to separate garbage from recyclables. But these systems usually encompass separate containers and/or separate drop-in holes or arrangements for different types of items. These systems consist of separate containers with different openings for different items. A patentabilty search conducted (a copy of the report is attached) found the following U.S. patents (copies provided in the appendix) that are pertinent to the invention described in this application:

U.S. Pat. No. 1,977,922, Inventor: Serre;
This patent to Serre discloses a tiltable container for ashes or ink.
U.S. Pat. No. 2,636,646, Inventor: Olsen;
This patent to Olsen discloses a powder box with separate compartments with a rotating cover.
U.S. Pat. No. 5,339,980, Inventor: Stutler;
This patent to Stutler discloses a trash container with separate compartments for different items. Each compartment has a separate entrance.
U.S. Pat. No. 5,205,433: Inventor: Bitsch;
This patent to Bitsch discloses a container with a mechanism for separating solid and liquid waste.

None of these designs is compact enough for use in today's households. Consequently, their use in households remained very limited. In today's household environment, not having a convenient system to separate recyclables from garbage is necessitating having storage containers at two different locations; usually a garbage can in the kitchen, and a can for recyclables in garage or outside of the house. Besides its inconvenience, this situation contributes to amount of recyclables not reclaimed but disposed with garbage.

In summary, the existing designs have not provided a convenient, effective, compact, and space efficient solution to this problem. The Y-shaped garbage and recyclables separating disposal system (referred to as "YSGR" in the remainder of this document) described here addresses this problem and provides a convenient, and space effective solution to it.

SUMMARY OF INVENTION

The YSGR system of the invention is for the separation, storage, and disposal of garbage and recyclables in office and household environments. The advantages of the invention include convenience in separating and storing garbage and recyclables, and in space usage.

The YSGR system has two containers tightly held together with a top piece that is housing a separation mechanism. One of the containers is reserved solely for the storage of garbage, and the other for recyclables. Each container is fitted with a garbage bag for the collection and removal of garbage or recyclables. The separation mechanism consists of a refuse drop-in chute, a chute for recyclables that is attached to the drop-in chute in the middle and at an angle to form an upside down "Y", and a separation mechanism operated by a foot pedal. The drop-in chute has an opening at the top that is normally covered by a lid to prevent unpleasant odors from the containers spreading. The entrance of the chute for recyclables is normally blocked by a blocker from inside the drop-in chute. The blocker is made of plastic material with a flexible piece around the tip that takes the contour of the surface it is pressed. The blocker is attached to the drop-in chute (at the entrance to the chute for the recyclables) with a hinge housing a spring that is keeping the blocker in an up-right position. In this position, the blocker is blocking the entrance of the chute for recyclables completely without forming any obstacle to garbage that may be dropped in.

The blocker is operated by a foot pedal that is on the floor supported by a vertical stand. The vertical stand is attached to the top part holding the containers together. The foot pedal is connected to the blocker by a string (or any other motion conveying mechanism) so that when the pedal is in normal position (i.e. not pressed), the blocker is in upright position. When the pedal is pressed down, it pulls the string and, as a result, the blocker is pulled away to the back wall of the drop-in chute from the opening of the chute for recyclables. In this position, the blocker blocks the drop-in chute and the passage to the garbage container. In this position (see FIG. 2), the blocker forms an inclined plane with one end attached to the bottom of the opening for the chute for recyclables (by the hinge) and the other end is higher than then the former at the opposite wall (inside) of the drop-in chute. The blocker has a flexible strip around its top edge. This flexible strip takes the shape of the inside wall of the drop-in chute when it is pressed against it (that is, when the foot pedal is pressed down). When the foot pedal is not pressed down, the string doesn't pull the blocker, and the spring in the hinge keeps the blocker at its upright position.

The operation of the YSGR comprises of the following. When a user is dropping garbage, s/he needs to lift the lid and drop garbage into the drop-in chute. Garbage that is disposed in this position will vertically travels through the drop-in chute directly in to the garbage container. If a recyclable item such as a bottle or a can is to be disposed, then the user steps on the foot pedal. The foot pedal moves a blocker into position to block the garbage container's passage way and provides a leading slide for recyclables to be dropped into the recyclables container through the recyclables chute. The foot pedal and the blocker return their original positions when the pedal is released.

In summary, the YSGR system separates garbage and recyclables in to two containers that are part of it with the help of a separation mechanism that forms the common top keeping the containers together. The separation of recyclables from regular garbage is achieved with the help of a foot-pedal operated mechanism. When depositing a recyclable item, all that a user needs to do is to press the pedal before disposing it. This design is providing a compact, functional, and space efficient solution to the recyclables separation process.

DESCRIPTION OF THE PREFERRED EMBODIMENT

Figure 1:
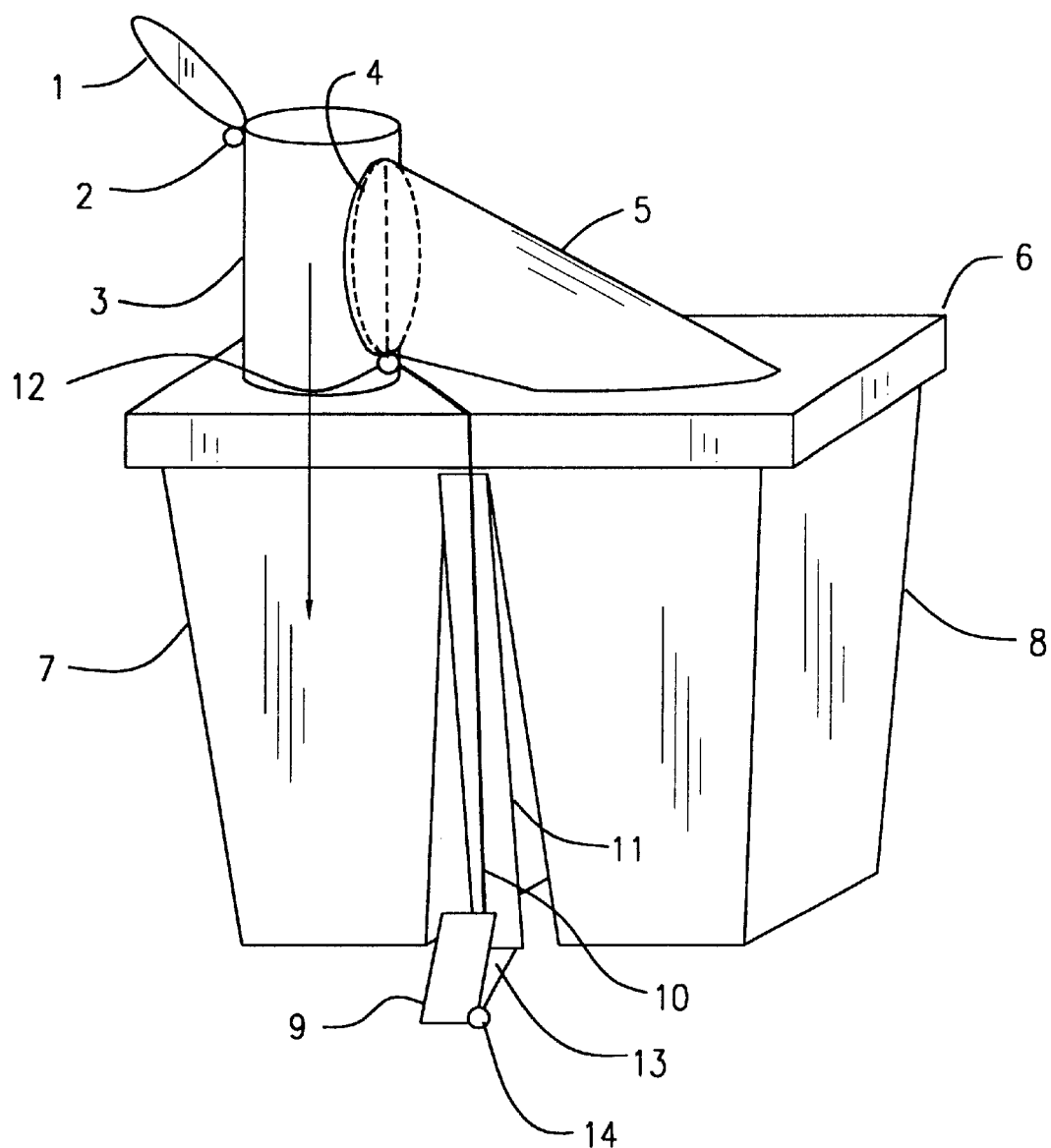
FIG. 1 shows a drawing of the Y-Shaped Garbage and Recyclables separating chute with its blocker in its normal up-right position for garbage disposal.

FIG. 1 shows the YSGR system with its blocker (4) in normal up-right position for garbage disposal. The top part of YSGR consists of a lid (1), a drop chute (3), a blocker (4), a chute for recyclables (5) that is connected to the drop-in chute (3) in the middle, and a frame (6) holding the garbage container (7) and the recyclables container (8) together. The lid (1) is attached to the drop chute (3) by a hinge (2). Normally, the lid is kept down to prevent unpleasant odors from the containers spreading. To drop garbage, the lid (1) is pulled back into a horizontal position (as shown in FIG. 1) to open the drop chute (3). In the normal standing position (i.e. with the drop chute open and the blocker in its upright position as shown in FIG. 1), YSGR is ready to store garbage. In this position, the blocker (4) is in up-right position blocking the chute for recyclables (5). Through the drop chute (3), garbage is dropped into the garbage container (7). After dropping garbage, the lid (1) is returned back to top to cover the drop chute (3).

Figure 2:
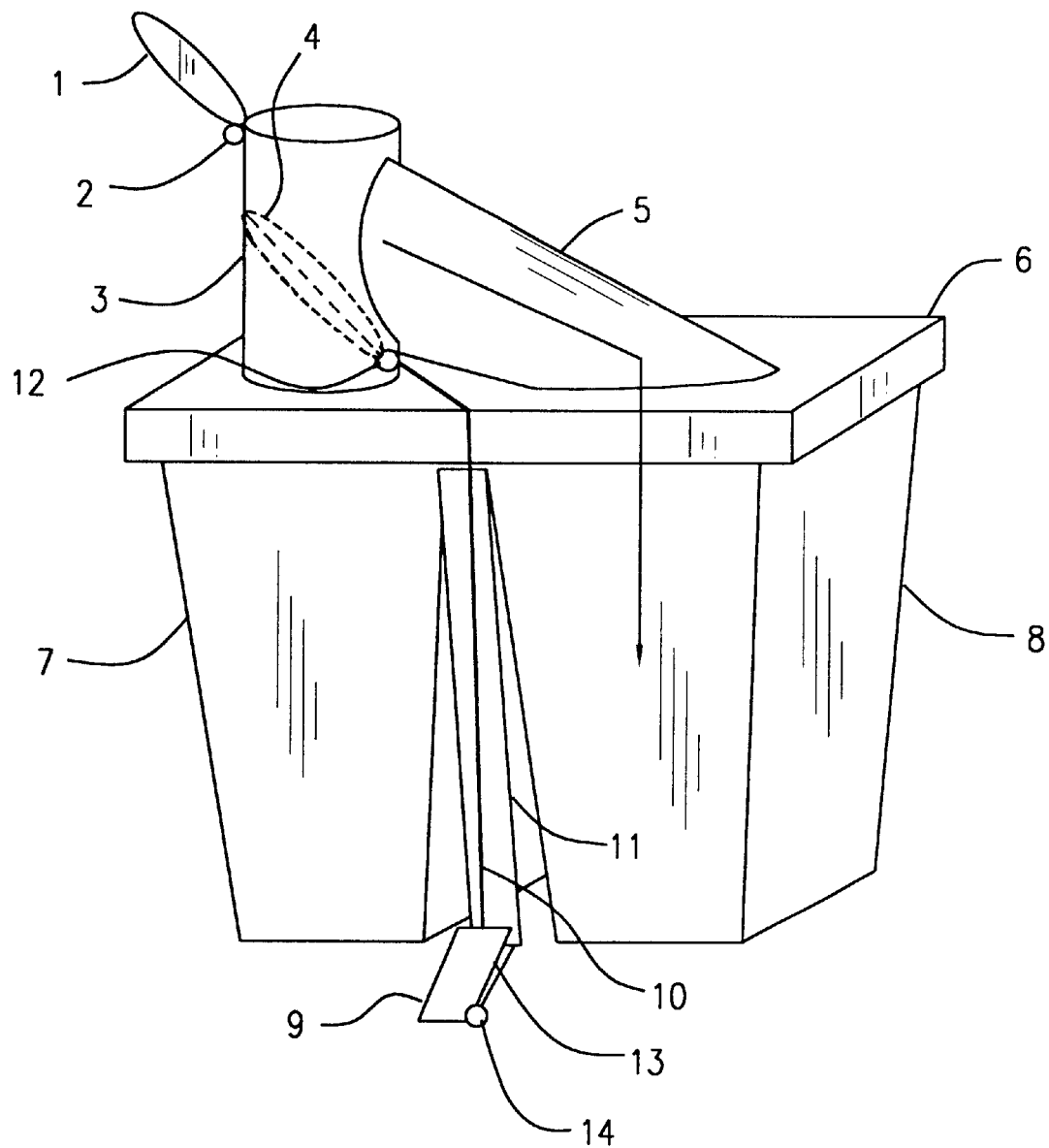
FIG. 2 shows the position that the blocker moves to when with pedal pressed down. In this position, the blocker blocks the passage into the garbage container and separates recyclables and stores them in the appropriate storage compartment.

FIG. 2 shows how YSGR separates and stores recyclable in the container for recyclables (8). The blocker (4) is attached to the chute for recyclables (5) by a hinge (12) that has a spring mechanism. The blocker (4) operated by a foot pedal (9). The pedal (9) is attached to the top frame (6) with a stand (11). With a string (10) through the stand (11), the foot pedal (9) is linked with the blocker (4). The foot pedal (9) is connected to the part (13) of the vertical stand (11) that is resting on the ground by a hinge (14) that also houses a spring. This spring keeps the front part of the pedal normally in up position. To deposit recyclables into the container for them (8), the foot pedal (9) is pressed down as shown in FIG. 2. The pedal (9) in pressed down position pulls the blocker (4) back to the opposite wall of the drop chute (3) with the help of the string (10). The blocker forms an inclined surface to guide the recyclables such as bottles and cans into the now-opened chute (5). Through this chute, recyclables are guided into the container (8). When depositing recyclables is completed, the blocker (4) is returned into its normal up-right position by releasing the foot pedal (9). When the pedal (9) is released, the spring mechanism attached to the hinge (14) returns the foot pedal (9) to its normal up position, and the hinge (12) returns the blocker (4) into its upright position. After dropping recyclables, the lid (1) is returned back to top to cover the drop chute (3).

It is to be understood that the embodiments of the invention herein described are merely illustrative of the application of the principles of the invention. Referenced herein to details of the illustrated embodiments are not intended to limit the scope of the claims, which themselves recite those features regarded as essential to the invention.

What is claimed:

1. A Y-shaped garbage and recyclables separating disposal system used in the household for separating garbage and a plurality of recyclables, the system comprising:

a) a top that comprises a lid, a drop-in chute, a chute for recyclables, and a frame, wherein the chute for recyclables is attached to a middle portion of said drop-in chute such that the chute for recyclables forms an up-side down "Y" with the drop-in chute;

b) a blocker located inside of the drop-in chute and blocking an opening to the chute for recyclables, said blocker pivotally attached to an inside wall of the drop-in chute;

c) a foot pedal attached to a vertical stand and connected with the blocker with a string, said vertical stand supported by said frame; and d) a garbage container and a recyclables storage container, wherein the drop-in chute is large enough for garbage and leads directly into the garbage container and the chute for recyclables is large enough for the unobstructed passage of bottles and cans, and leads into the recyclables storage container, said containers optionally fitted with a garbage bag;

e) said frame holding the garbage container and the recyclables storage container together and comprising a horizontally extending top portion with downwardly extending edge members that form a lip that surrounds the garbage container and the recyclables container, said drop-in chute and said chute for recyclables being integrally connected with the top portion of said frame, wherein said drop-in chute is perpendicular to the horizontally extending top portion.

2. The Y-shaped garbage and recyclables separating system of claim 1, wherein the recyclables chute is normally blocked by a blocker said recyclables chute by a spring and a hinge, wherein garbage is deposited directly into the garbage container when the blocker is in an upright position.

3. The Y-shaped garbage and recyclables separating system of claim 1, wherein a foot pedal is connected to said vertical stand by a hinge that houses a spring, said hinge and spring functioning to open or close the blocker.

4. The Y-shaped garbage and recyclables separating system of claim 1, wherein a blocker is opened by pressing the foot pedal down when recyclables are to be deposited in the container for them.

5. The Y-shaped garbage and recyclables separating system of claim 1, wherein the blocker is pulled back, forming an inclined plane leading recyclables into the chute for recyclables, by pressing the foot pedal down when recyclables are to be deposited, said blocker returning to its upright position blocking the chute for recyclables by releasing the foot pedal.

6. The Y-shaped garbage and recyclables separating system of claim 1, wherein the spring housed by the hinge attaching the blocker to the inside wall of the drop-in, and the spring housed by the hinge attaching the foot pedal to the vertical stand return both the blocker and the foot pedal to their normal up position.

\* \* \* \* \*